United States Patent [19]
Chevallier et al.

[11] Patent Number: 5,818,289
[45] Date of Patent: Oct. 6, 1998

[54] CLOCKING SCHEME AND CHARGE TRANSFER SWITCH FOR INCREASING THE EFFICIENCY OF A CHARGE PUMP OR OTHER CIRCUIT

[75] Inventors: Christophe J. Chevallier, Palo Alto; Vinod C. Lakhani, Milpitas, both of Calif.

[73] Assignee: Micron Technology, Inc., Boise, Id.

[21] Appl. No.: 683,474

[22] Filed: Jul. 18, 1996

[51] Int. Cl.[6] ........................................... H03L 1/00
[52] U.S. Cl. ........................... 327/536; 327/537; 327/541
[58] Field of Search .................................. 327/331, 332, 327/536, 537, 540, 541, 543, 544, 534; 365/226

[56] References Cited

U.S. PATENT DOCUMENTS

| | | | |
|---|---|---|---|
| 4,336,466 | 6/1982 | Sud et al. | 327/537 |
| 5,140,182 | 8/1992 | Ichimiura | 327/537 |
| 5,191,232 | 3/1993 | Wang | 327/534 |
| 5,301,097 | 4/1994 | McDaniel | 363/60 |

*Primary Examiner*—Timothy P. Callahan
*Assistant Examiner*—Eunja Shin
*Attorney, Agent, or Firm*—Schwegman, Lundberg, Woessner & Kluth, P.A.

[57] ABSTRACT

An efficient charge pump circuit. Increased efficiency compared to previous pump circuits is achieved through use of a novel charge transfer switch and associated clocking scheme which reduces the supply current required to operate the charge pump. Instead of repeatedly charging and discharging a stray capacitance of each pump stage capacitor, some of the charge stored in the stray capacitor on the clock driver side is transferred to the next pump stage. This serves to pre-charge the stray capacitor of the next stage, reducing the supply current required to operate the charge pump. The apparatus and method described can also be used to reduce the power consumed by a system or circuit which has internal signals or nodes which are in opposite phase to each other. This is accomplished by reducing the power used to charge and discharge a stray capacitance associated with the signals or nodes.

32 Claims, 14 Drawing Sheets

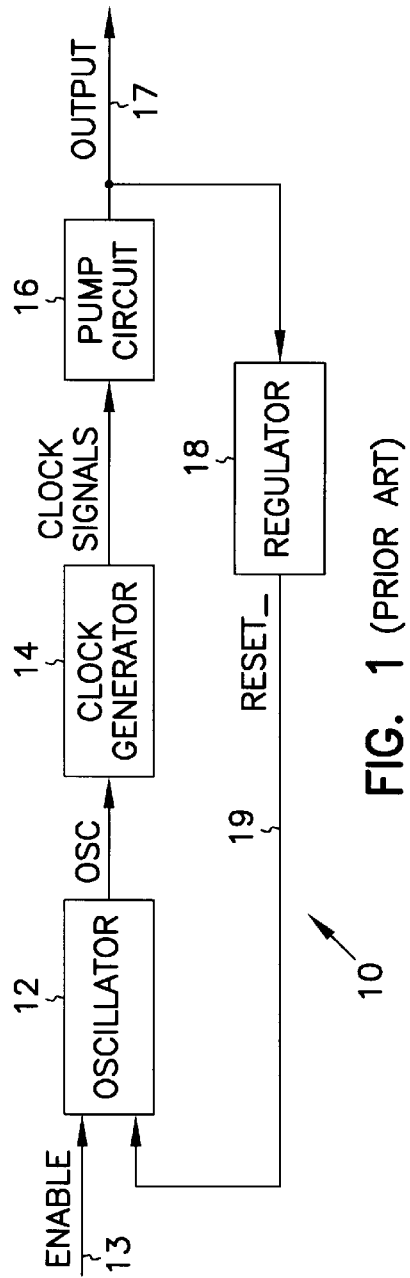
FIG. 1 (PRIOR ART)
FIG. 2A (PRIOR ART)
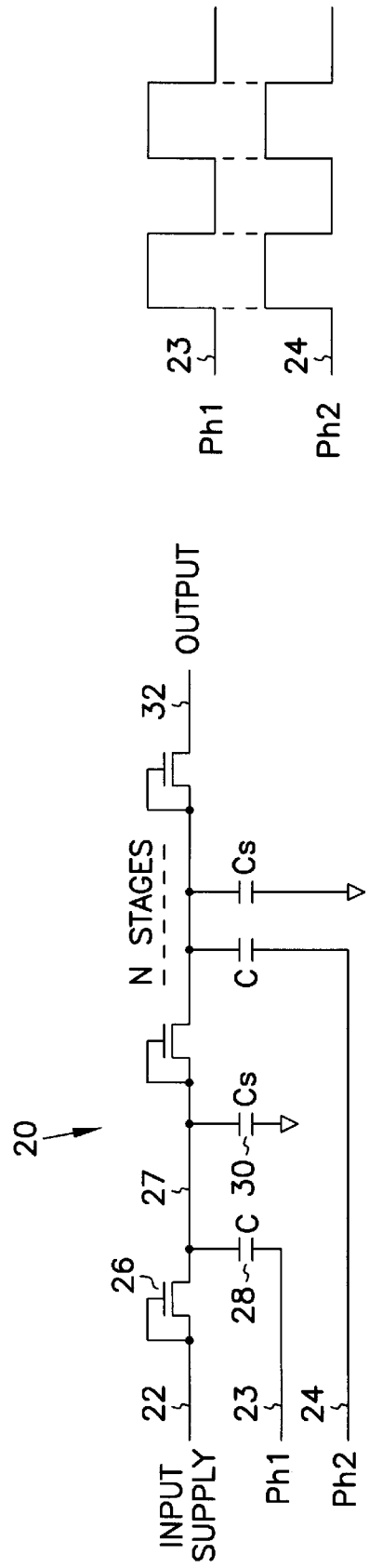
FIG. 2B (PRIOR ART)

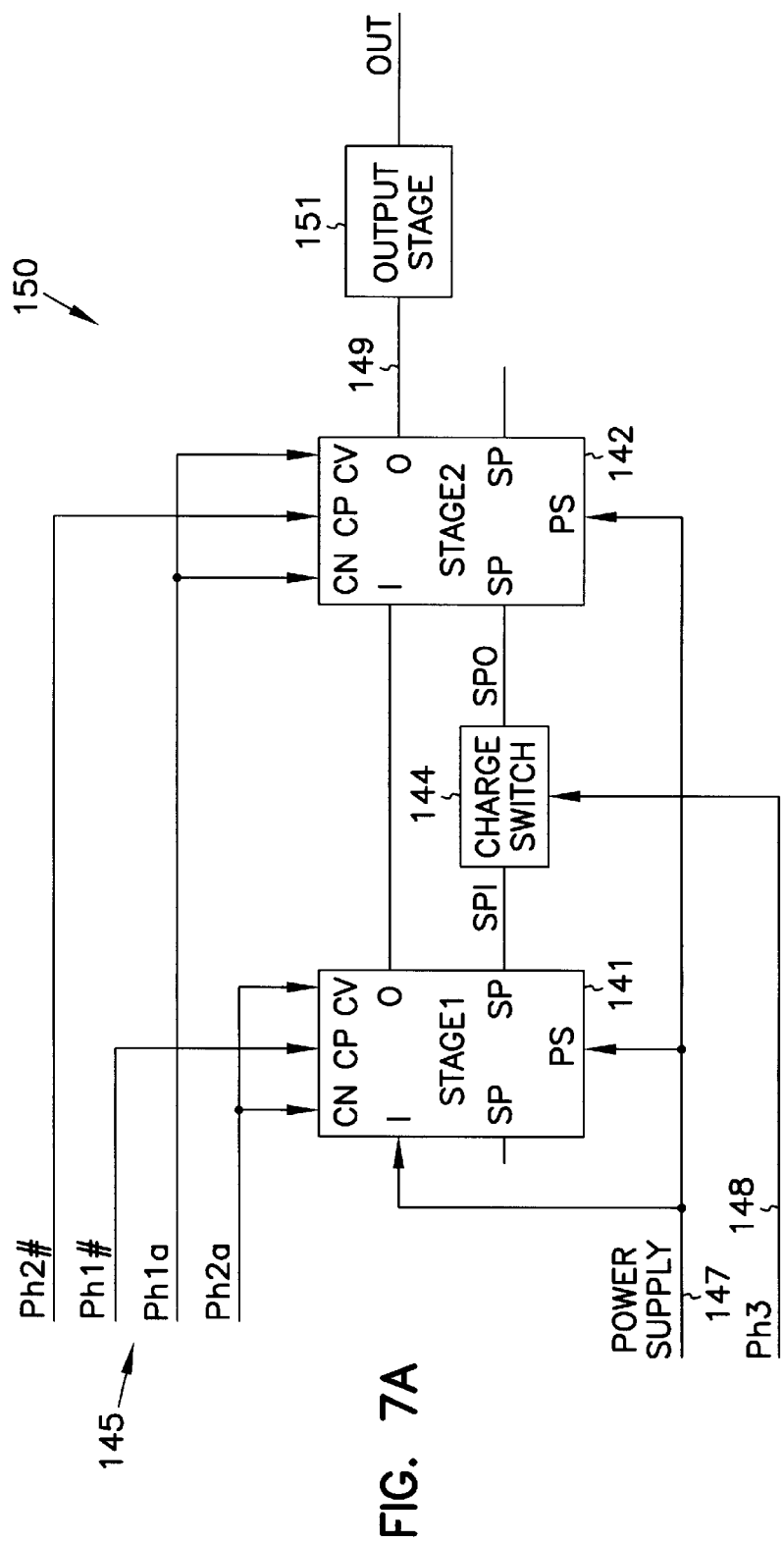
FIG. 7A
FIG. 7B
FIG. 7C

CLOCKING SCHEME AND CHARGE TRANSFER SWITCH FOR INCREASING THE EFFICIENCY OF A CHARGE PUMP OR OTHER CIRCUIT

TECHNICAL FIELD

The present invention is directed to charge pumps used for the purpose of increasing a supply voltage to obtain a higher voltage needed to operate a circuit element, and more specifically, to a design for a charge pump having a clocking scheme and charge transfer switch which increases its efficiency. The clocking scheme and charge transfer switch may also be used to reduce the power consumption of other circuits having internal signals or nodes that are in opposite phase to each other.

BACKGROUND OF THE INVENTION

Voltage multipliers are commonly used to increase the voltage of a supply source in order to provide the higher voltages needed to operate circuit elements. One type of voltage multiplier is termed a charge pump, and is commonly used in non-volatile memory systems to provide the voltages needed for programming and erasing memory cells. A charge pump functions by progressively storing more charge on a capacitor which is part of a capacitor-diode combination, with several such stages being placed together in a network to obtain the desired increase in voltage. The diode functions to prevent discharge of the capacitor prior to its having additional charge placed on it. In charge pump designs which are fabricated using integrated circuit processing methods, both the diode and the capacitor are typically formed from properly configured transistors.

A clock signal is used to trigger the charging of the capacitor(s), with the clock frequency being such that the clock signal period is less than the discharge time of the capacitor(s). Typically, two clock signals having opposite phase are used to charge alternate stages of a multi-stage charge pump. The opposite phase clock signals are used to increase the amount of charge which can be placed on the capacitors.

FIG. 1 is a block diagram showing the components of a typical charge pump 10. Charge pump 10 includes oscillator 12 which is used to trigger the production of the clock signals by clock generator 14. The operation of oscillator 12 is initiated by enable signal 13. Clock generator 14 outputs the clock signals used to control the charging of the capacitors contained in pump circuit 16. Regulator 18 samples the output 17 of pump circuit 16 and generates reset signal 19 when pump circuit 16 outputs the appropriate voltage. Regulator 18 is used to control the operation of oscillator 12 in order to cause output 17 of pump circuit 16 to approach the desired output voltage. This is accomplished by turning oscillator 12 on or off, which in turn affects the frequency of the clock signals produced by clock generator 14.

FIG. 2A is a schematic diagram of a pump circuit 20 which can be used as part of a voltage multiplier, such as the charge pump of FIG. 1. The circuit of FIG. 2A is representative of that found in pump circuit 16 of FIG. 1. As shown in FIG. 2, the inputs to the circuit are an input supply voltage 22 and two clock signals, shown as Ph 1 23 and Ph 2 24 in the figure. As shown in FIG. 2B, clock signals 23 and 24 are typically square waves having opposite phases and an amplitude corresponding to the magnitude of external power supply 22. Input supply voltage 22 provides the supply of charge for the charge pump.

Clock signals 23 and 24 are connected to alternating stages of charge pump circuit 20, where each stage is composed of a transistor 26 configured to function as a diode, a pump capacitor 28 (labelled "C" in the figure), and a stray capacitance 30 representing the parasitic capacitance between node 27 (the charged node for that pump stage) and the substrate (labelled "$C_s$" in the figure). Transistor 26 is typically configured to act as a diode by connecting the gate to the drain. Clock signal 23 or 24 is connected to one side of pump capacitor 28, with the other side of the capacitor being connected to the diode (transistor).

As shown in the figure, a total of N such stages are connected in a serial manner, eventually producing output voltage 32. Each stage has a diode, pump capacitor, and stray capacitance, as well as an associated clock signal. Pump capacitor 28 is typically implemented in the form of a properly configured transistor. In such a case, there is an additional stray capacitance associated with the configured transistor, the associated routing, and adjacent devices. This may be termed the stray capacitance on the clock driver side of the pump capacitor. Note that as before, there is a stray capacitance on the pumped node side (the capacitance labelled $C_s$ in FIG. 2A). This clock driver side stray capacitance must be charged and discharged with each cycling of the stages of the charge pump, thereby increasing the power required to operate the pump.

The efficiency of charge pump circuit 20 is determined by the ratio of the output power to input power, and is given by:

$$\text{Efficiency} = \frac{V_{out} \cdot I_{load}}{V_{supply} \cdot I_{supply}}$$

$V_{out} = V_{supply} + N \bullet [C/(C+C_s)] \bullet V_{supply} - VTN] - VTN - V_{dl},$ where $V_{supply}$=Supply voltage to the pump circuit (Input);

N=number of charge pump stages;

VTN=voltage drop across the diode in a pump stage;

$V_{dl}$=voltage drop due to the load current (depends upon N, clock frequency, load current, diode resistance, and pump stage capacitance);

C=pump capacitance per stage; and $C_s$=stray capacitance per stage on the pumped node side. Inspection of the expression for the pump efficiency shows that the efficiency may be increased by increasing $V_{out}$ or by decreasing $I_{supply}$ for a given number of stages. Previous attempts to increase the efficiency have focused on increasing $V_{out}$. This has been accomplished by use of threshold cancellation techniques (such as those which will be described with reference to FIG. 3) and/or by using transistors having lower threshold voltages for the pump stage diodes. However, a disadvantage to using lower threshold voltage transistors is that they require additional manufacturing steps. $V_{out}$ can also be increased by reducing $C_s$, which can be accomplished by optimizing the physical implementation of the charge pump.

FIG. 3A is a schematic diagram for a pump circuit 50 which uses the technique of Vt (threshold voltage) cancellation to increase the output voltage (and hence efficiency) of a charge pump. The threshold voltage of a transistor configured to act as a diode corresponds to the VTN voltage drop term in the expression for the pump efficiency. As shown in FIG. 3A, four clock signals, labelled Ph 1 52, Ph 1a 54, Ph 2 56, and Ph 2a 58 in FIG. 3B, are now used to control the operation of the circuit. As indicated in timing diagram FIG. 3B, clock signals Ph 1 52 and Ph 2 56 are typically square waves having opposite phase, while clock signals Ph 1*a* 54 and Ph 2*a* 58 are square waves that have a duty cycle that is smaller than that of signals Ph 1 and Ph 2. Signals Ph 1*a* 54 and Ph 2*a* 58 are square waves with a shorter time at which they have a high value than do signals Ph 1 and Ph 2.

Each stage of pump circuit 50 of FIG. 3A is composed of a switching transistor 60 (labelled "A" in the figure), a capacitor 62 connected between the gate of that transistor and a clock signal, a transistor 64 (labelled "B" in the figure) configured to act as a diode when transistor 60 is switched "on", and a pump capacitor 66 (labelled "C" in the figure). Capacitor 68 (labelled "$C_s$" in the figure) represents the stray capacitance on the charged node side for the stage of the circuit. Capacitor 76 (labelled "$C_c$" in the figure) represents the stray capacitance of pump capacitor 66 on the clock side of the circuit, which arises in the case where pump capacitor 66 is implemented in the form of a properly configured transistor or another fabricated capacitor.

In the operation of circuit 50, at time t1 (see FIG. 3B), clock signal Ph 1 52 goes high, charging capacitor 66 and causing the node labelled "STAGE 1" to be pumped by an amount which depends upon the ratio of C and $C_s$. This causes transistor 60 to turn on, thereby connecting input supply voltage 70 to the node labelled VG1. After clock signal Ph 1 52 goes low, and at time t2, clock signal Ph 2*a* 58 goes high, charging capacitor 62 and pumping node VG1. This raises the voltage at node VG1 above input supply level 70.

The pumping of node VG1 causes transistor 64 to turn on, charging node STAGE 1 to input supply level 70. The Vt cancellation stage composed of transistor 60, capacitor 62, and clock signal Ph 2*a* 58 compensates for the threshold voltage (Vt) drop across transistor 64. In the absence of the cancellation stage, the threshold voltage drop would cause the voltage at node STAGE 1 to be (input supply 70–Vt). The cancellation technique serves to increase the voltage available at node STAGE 1 for use as the baseline voltage for the next pump stage.

At time t3 shown in timing diagram 3B, node STAGE 1 has been set to input supply level 70. This node is pumped up from this level on the rising edge of clock signal Ph 1 52. Clock signal Ph 2 56 and Ph 1*a* 54 are then used as shown in the timing diagram to increase the voltage at STAGE 2 by means of a second stage of pump circuit 50. The second stage operates in the same manner as the first stage which has been described, with the exception that instead of pre-charging the stage to a level corresponding to the input supply (corresponding to setting node VG1 to input level 70), node VG2 is pre-charged to a level equal to that of the voltage at node STAGE 1. This is accomplished by using clock signal Ph 2 56 to charge capacitor 67, thereby turning on switching transistor 61 and connecting node STAGE 1 to node VG 2. Clock signal Ph 1*a* 54 is then used to charge capacitor 63, pumping node VG2. This turns on transistor 65, charging node STAGE 2 to the level corresponding to node STAGE 1 (instead of the value STAGE 1–Vt, where Vt is the threshold voltage drop of transistor 65).

Note that although only two pump stages are shown in FIG. 3A, a greater number may of course be used. Each stage will contain a Vt cancellation circuit of the type shown, with the accompanying clock signals. At the end of the stages an output transistor 72 which is configured to act as a diode is used to shield the final pumped voltage from the load or output capacitance connected at output node 74.

Although the Vt cancellation charge pump circuit of FIG. 3A is an improvement over that of the standard circuit shown in FIG. 2, it still has some inefficient aspects. In particular, each stage requires the charging and discharging of capacitor 76, which has a capacitance dependent upon the structure of the transistor (or other form of capacitor) from which it is made. The charging and discharging represents work which is performed to operate the circuit, and since the discharged charge is conducted to ground, it is an expenditure of power which is not recaptured in later cycles of the pump. This causes an increase in the magnitude of $I_{supply}$ over what would be required in the absence of such a capacitance, and hence an increase in the power required to operate the circuit. This reduces the efficiency of the charge pump circuit. One way to address this problem is to use capacitor designs which limit the stray capacitance of the device, e.g., poly-poly capacitors. However, in most instances this approach is undesirable as it requires additional manufacturing steps, increasing the cost of the charge pump.

Although the increased power required to charge and discharge capacitor 76 (the stray capacitance on the clock side of the circuit) has been described with reference to the operation of a charge pump, this problem is also found in other types of circuits. In particular, any system or circuit having internal signals or nodes in opposite phase to each other may exhibit this behavior. Any circuit in which opposite phase signals act to charge and discharge an associated stray capacitance will require greater power to operate as a result of this situation.

What is desired is a charge pump circuit for use in generating higher voltages from a lower input supply voltage which is more efficient than existing charge pump circuits. This is particularly important in applications where the load current is small and power consumption is a critical concern. It is also desired to have an apparatus and method for reducing the power consumption of systems in which opposite phase signals which charge and discharge an associated stray capacitance are used as part of a circuit.

SUMMARY OF THE INVENTION

The present invention is directed to an efficient charge pump circuit. The increased efficiency compared to previous pump circuits is achieved through use of a novel charge transfer switch and associated clocking scheme which act to reduce the supply current required to operate the pump. Instead of repeatedly charging and discharging a capacitor representing the stray capacitance of the pump stage capacitor on the clock side of the circuit, some of the charge stored in the stray capacitor is transferred to the next pump stage. This serves to pre-charge the stray capacitor of the next stage, reducing the supply current required to operate the next stage and that of the overall charge pump.

The present invention is also directed to an apparatus and method for reducing the power consumed by a system or circuit having internal signals or nodes which are in opposite phase to each other. This is accomplished by reducing the power used to charge and discharge a stray capacitance associated with the signals or nodes.

Further objects and advantages of the present invention will become apparent from the following detailed description and accompanying drawings.

BRIEF DESCRIPTION OF THE DRAWINGS

FIG. 1 is a block diagram showing the components of a typical charge pump.

FIG. 2A is a schematic diagram of a pump circuit suitable for use in the charge pump of FIG. 1.

FIG. 2B is a timing diagram for the pump circuit of FIG. 2A.

FIG. 7A is a block diagram showing a two stage pump circuit and the associated charge transfer switch suited for use in the charge pump of the present invention.

FIGS. 7B and 7C are schematics for example embodiments of the charge transfer switch and output stage of the pump circuit of FIG. 7A.

DETAILED DESCRIPTION OF THE INVENTION

In accordance with the present invention, a charge pump utilizing a novel clocking scheme and charge transfer (conservation) switch is used to reduce the supply current required to operate the device. This reduces the power required to operate the charge pump. The result is a charge pump having an increased efficiency compared to circuits used in similar applications. The clocking scheme and charge transfer switch described herein may also be used to reduce the power consumed by other circuits having internal signals or nodes which are in opposite phase to each other by reducing the power used to charge and discharge a stray capacitance associated with the signals or nodes.

Figure 4:
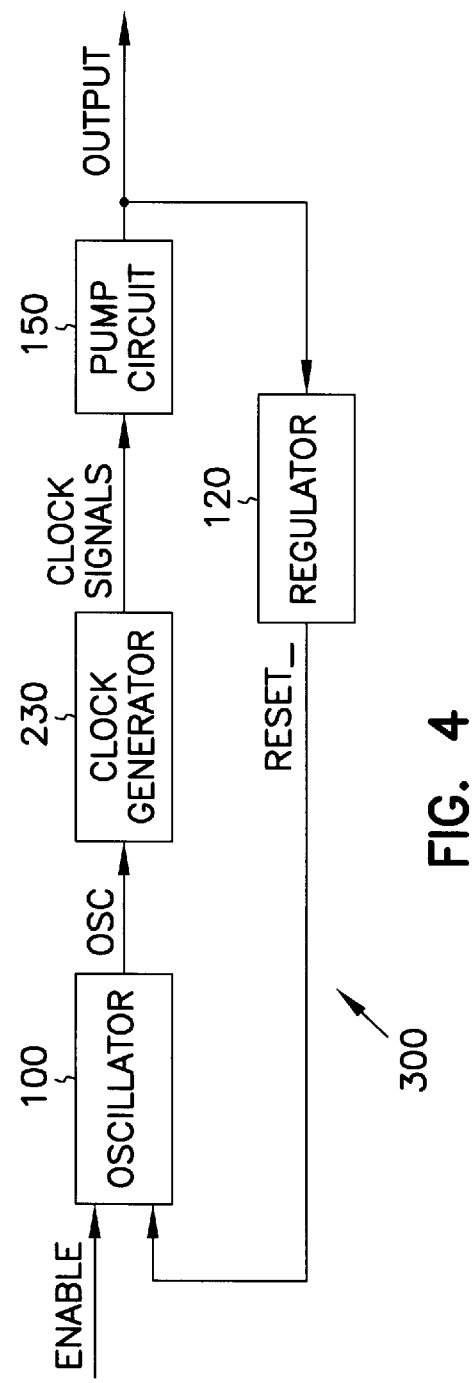
FIG. 4 is a block diagram showing the components of the charge pump of the present invention.

FIG. 4 is a block diagram showing the components of the charge pump 300 of the present invention. As is apparent, charge pump 300 contains the basic functional blocks shown in FIG. 1. However, as will be described, the blocks (particularly pump circuit 150) are implemented in the form of novel and non-obvious circuits which achieve an improved efficiency for the charge pump.

Charge pump 300 includes oscillator 100 which is used to trigger the production of the clock signals by clock generator 230, where the operation of oscillator 100 is initiated by an enable signal. Clock generator 230 outputs the clock signals used to control the charging of the capacitors contained in pump circuit 150. Regulator 120 samples the output of pump circuit 150 and generates a reset signal when pump circuit 150 outputs the appropriate voltage. Regulator 120 is used to control the operation of oscillator 100 in order to cause the output of pump circuit 150 to approach the desired output voltage.

Figure 5:
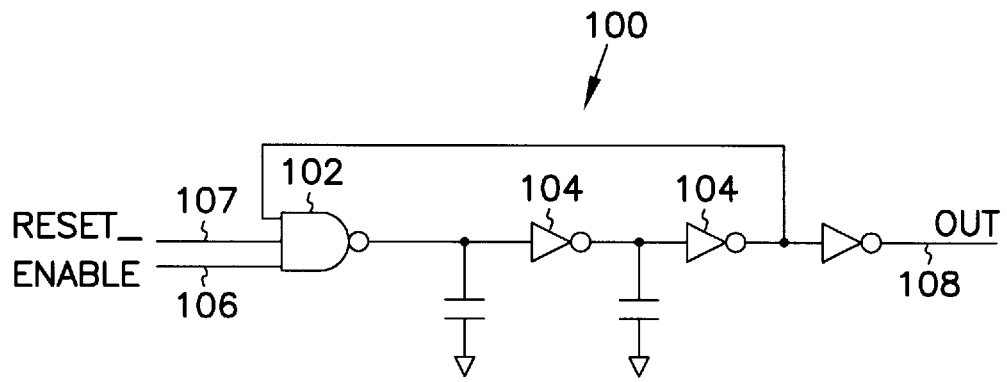
FIG. 5 is a schematic diagram for the oscillator stage used in the charge pump of the present invention.

FIG. 5 is a schematic diagram for the oscillator stage 100 used in the charge pump of the present invention. Oscillator 100 is a ring oscillator composed of a chain of delay elements with the output of the last delay element being fed back to the input of the first delay element in order to maintain the oscillations. In FIG. 5, the first stage delay element is NAND gate 102, while the remaining stages are composed of inverters 104. Enable signal 106 is used to initiate the operation of oscillator 100. Reset signal 107 is used to trigger a new sequence of oscillations. Output signal 108 is provided as an input to the clock generator which will be described later.

Figure 6:
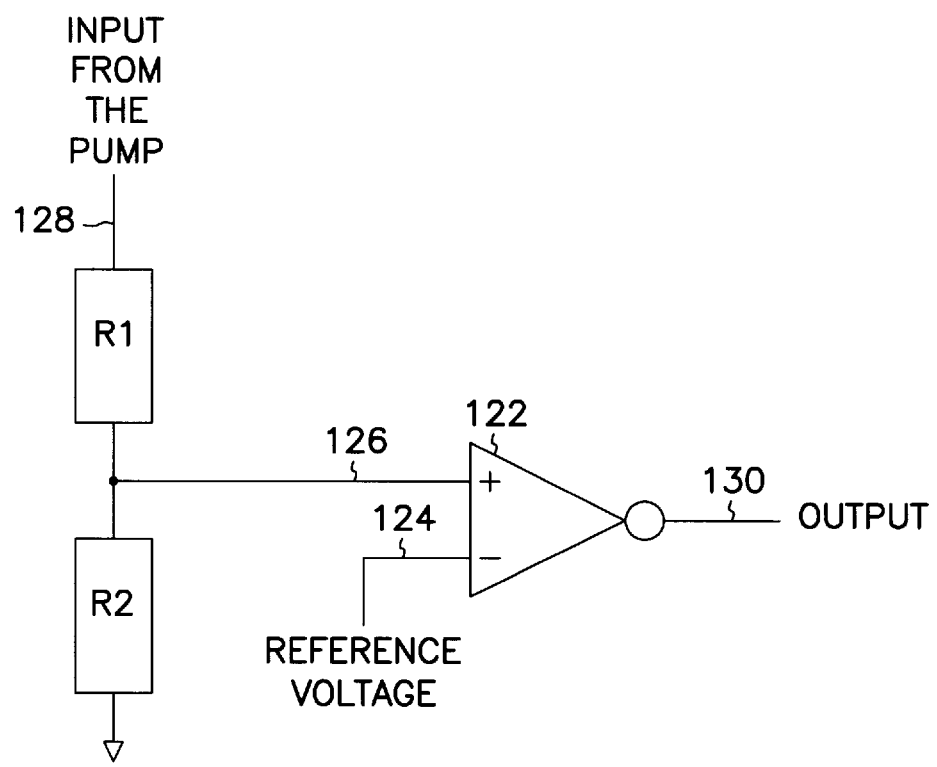
FIG. 6 is a schematic diagram for the regulator stage used in the charge pump of the present invention.

FIG. 6 is a schematic diagram for the regulator stage 120 used in the charge pump of the present invention. Regulator 120 is composed of a differential amplifier 122 having a fixed reference voltage as a first input 124 and a divided pump circuit output 126 as a second input. Pump circuit output signal 128 is provided from the pump circuit to be described later, and is divided by means of a resistor divider composed of resistors R1 and R2, as shown in the figure. The ratio of R1 to R2 is chosen so as to provide the proper trip point for differential amplifier 122. Output signal 130 of regulator stage 122 is the reset control signal 106 to oscillator stage 100 of FIG. 5.

FIG. 7A is a block diagram showing a two stage pump circuit and associated charge transfer switch 150 suited for use in the charge pump of the present invention. The figure shows a first pump stage 141 (labelled "STAGE 1" in the figure) and a second pump stage 142 (labelled "STAGE 2" in the figure), connected by charge transfer switch 144. Stage 1 141 has as inputs clock signals 145 and stage input voltage 147. If pump stage 141 is the first stage in the charge pump, then stage input voltage 147 is the input supply voltage. The output of Stage 1 141 is provided as an input to charge transfer switch 144 (labelled "SPI" in the figure). The operation of charge transfer switch 144 is controlled by clock signal 148. The output of charge transfer switch 144 (labelled "SPO" in the figure) is provided as an input to Stage 2 142, which also has clock signals 145 as inputs. The output 149 of Stage 2 142 provides the input to output stage 151, which provides the output voltage (labelled "OUT" in the figure) of pump circuit 150. Although only two pump stages are shown in the figure, it is understood that other numbers of such stages may be used, with each stage or pair of stages being connected by a charge transfer switch 144 of the type to be described. Embodiments of the charge pump of the present invention having more than two stages will be described later with reference to FIGS. 11 and 12.

FIGS. 7B and 7C are schematics for example embodiments of charge transfer switch 144 and output stage 151, respectively, of pump circuit 150 of FIG. 7A. As shown in FIG. 7B, charge transfer switch 144 may be implemented in the form of a transistor configured to operate as a switch. The "Input" connection to the transistor is provided from the pump stage prior to charge transfer switch 144, while the "Output" connection of the transistor is connected to the subsequent stage in a manner to be described. The "Enable" signal connected to the gate of the transistor is a control signal (labelled as clock signal 148 in FIG. 7A) used to activate the switch. As shown in FIG. 7C, output stage 151 may be implemented in the form of a transistor configured to operate as a diode which acts to shield the final pumped voltage from a load or output capacitance connected to the output.

Figure 7D:
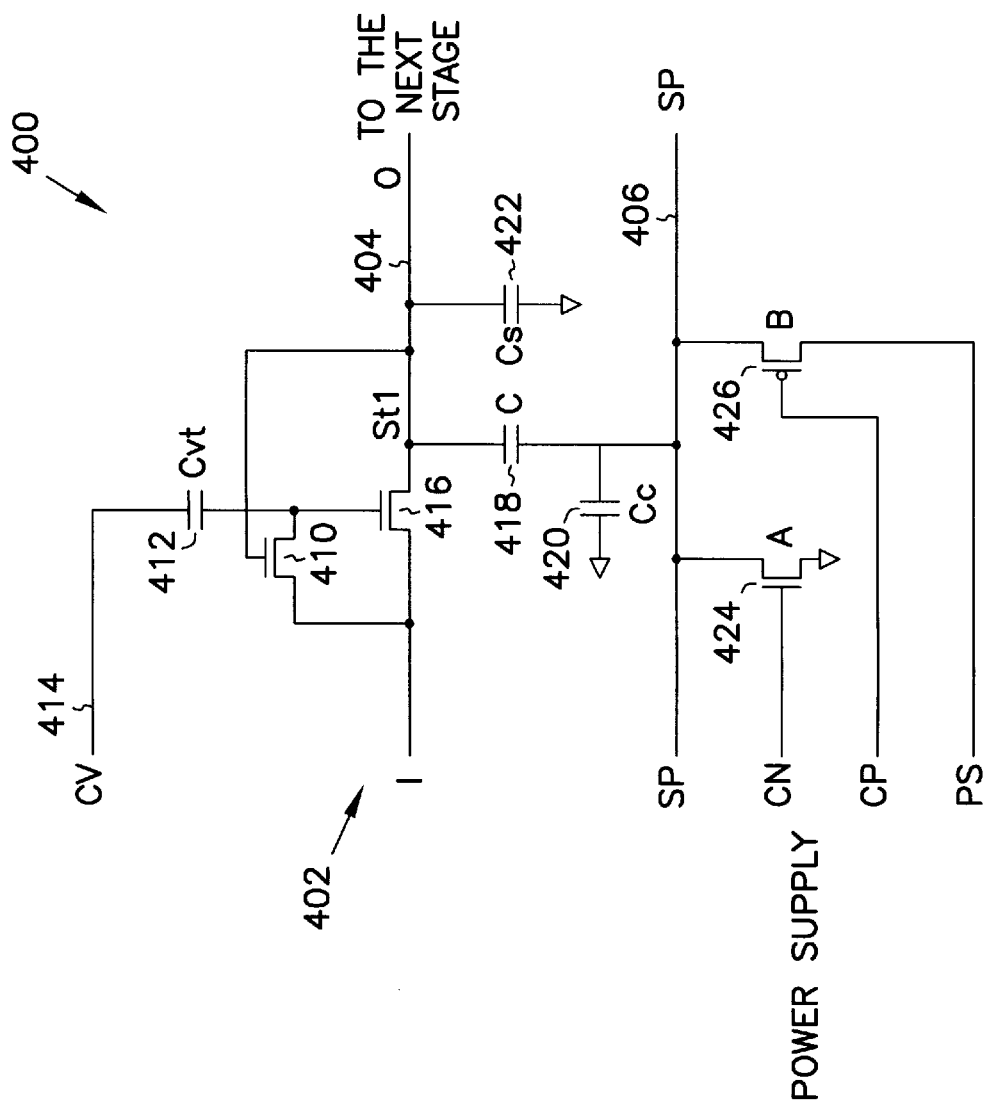
FIG. 7D is a schematic diagram for a single stage of the pump circuit of FIG. 7A.

FIG. 7D is a schematic diagram for a single stage 400 of the pump circuit of FIG. 7A. The diagram shows the circuit elements which would be used to implement either first pump stage 141 or second pump stage 142 of FIG. 7A. Pump stage circuit 400 may also be used to add additional stages to the two stage or multiple stage pump circuits described later in this application.

As shown in FIG. 7D, the input to stage 400 is input supply 402, which depending upon the configuration may be either an input power supply voltage or the output from a previous pump stage. Output 404 from stage 400 provides the input to the next stage, or to an output stage if stage 400 is the last in the charge pump. In the case of stage 400 not being the last pump stage, node SP 406 would be connected to a charge transfer switch of the type to be described.

Stage 400 is composed of a switching transistor 410, a capacitor 412 (labelled Cvt in the figure) connected between the drain of that transistor and a clock signal 414, a transistor 416 configured to act as a diode when transistor 410 is switched "on", and a pump capacitor 418 (labelled "C" in the figure). Capacitor 420 (labelled "$C_c$" in the figure) represents the stray (or parasitic) capacitance on the clock driver side associated with capacitor 418, and is dependent upon the manner in which capacitor 418 is implemented. Capacitor 422 (labelled "$C_s$" in the figure) represents the stray capacitance on the charged node side associated with this stage of the circuit.

Transistor 424 (labelled "A" in the figure) is used to selectively connect node SP to ground when clock signal CN is active. Transistor 426 (labelled "B" in the figure) is used to selectively connect node SP to the power supply level (labelled "PS" in the figure) when clock signal CP is low. Transistors 424 and 426 function as drivers for the clock signals used to charge the pump stage capacitors of the charge pump. The charge transfer switch of the present invention is used to transfer a portion of the charge stored in capacitor 420 to a corresponding capacitor in the pump stage subsequent to stage 400 and is implemented and controlled in a manner to be described.

Figures 3A, 3B:
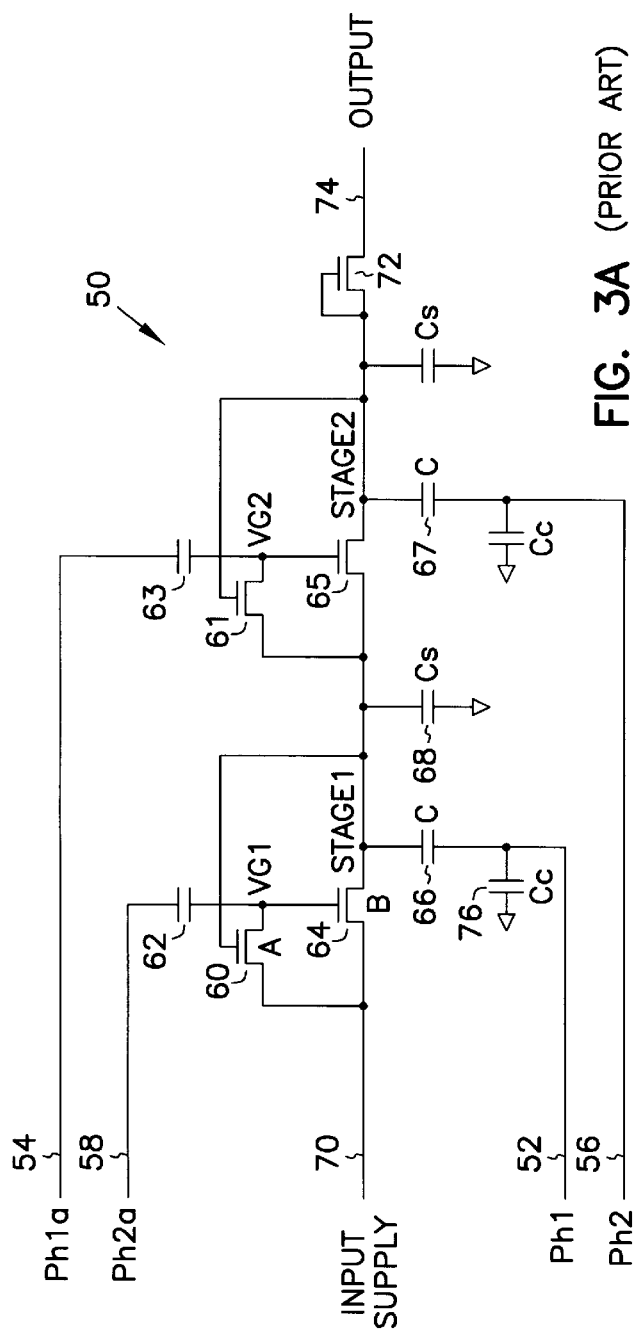
FIG. 3A is a schematic diagram of a pump circuit which uses the technique of Vt cancellation to improve the efficiency of the charge pump.
FIG. 3B is a timing diagram for the pump circuit of FIG. 3A.
Figure 8:
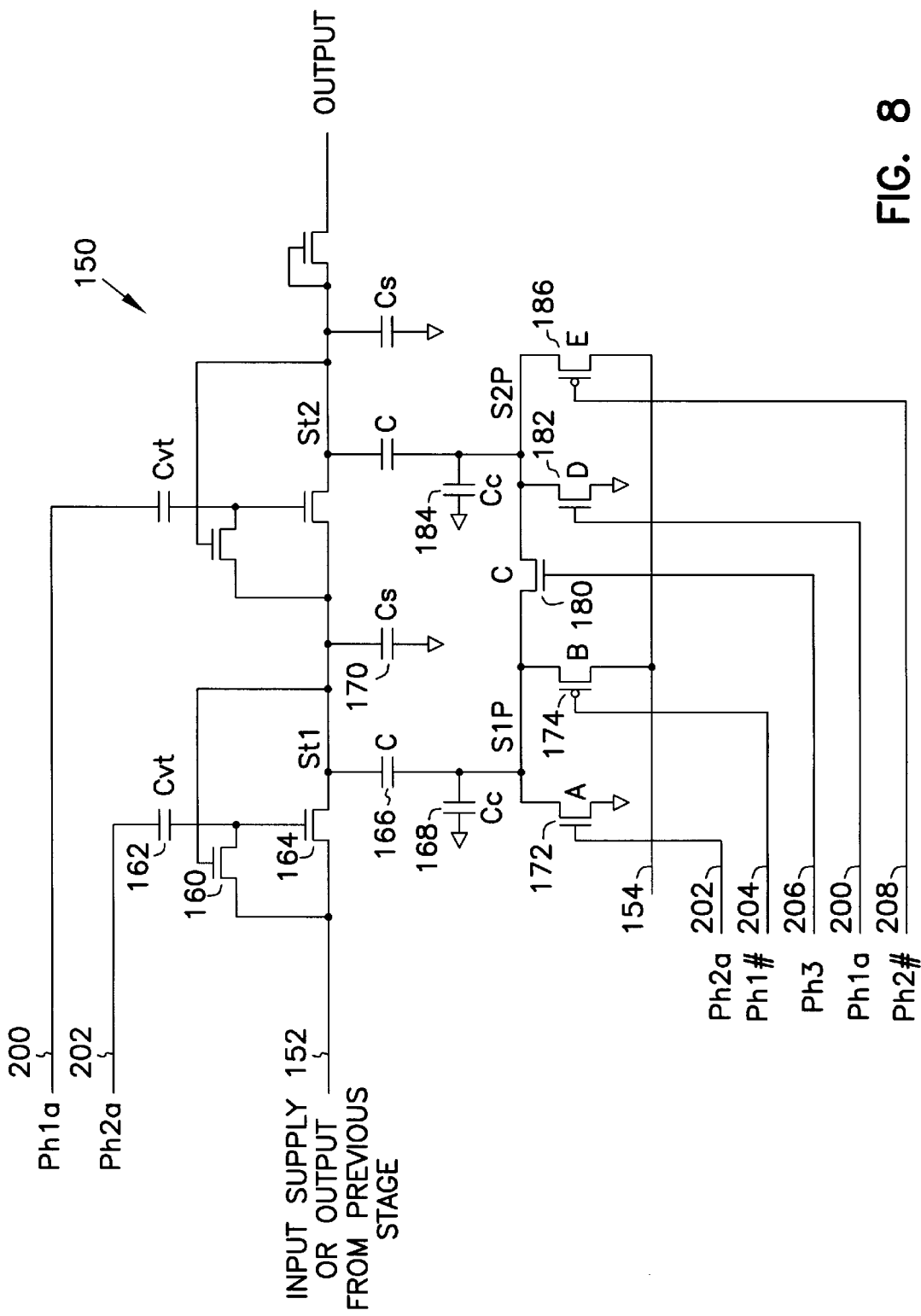
FIG. 8 is a schematic diagram for the two stage pump circuit corresponding to the block diagram of FIG. 7A for use in the charge pump of the present invention.

FIG. 8 is a schematic diagram for two stage pump circuit 150 corresponding to the block diagram of FIG. 7A for use in the charge pump of the present invention. The figure shows a pump circuit composed of two pump stages, although it is understood that the circuit may include other numbers of stages. As with the pump stage of FIG. 7D, the pump stages shown in FIG. 8 utilize the Vt cancellation technique described with reference to FIG. 3 to compensate for the voltage drop across the diode (transistor) of each pump stage.

Each stage of charge pump circuit 150 of FIG. 8 is composed of a switching transistor 160, a capacitor 162 (labelled Cvt in the figure) connected between the drain of that transistor and a clock signal, a transistor 164 configured to act as a diode when transistor 160 is switched "on", and a pump capacitor 166 (labelled "C" in the figure). Capacitor 168 (labelled "$C_c$" in the figure) represents the stray (or parasitic) capacitance on the clock driver side associated with capacitor 166, and is dependent upon the manner in which capacitor 166 is implemented. As will be discussed, transistors 172 and 174 are used in conjunction with non-overlapping (not active at the same time) clock signals as drivers for the clock signals. Power supply line 154 is used as the power source for clock driver transistor 174 (and for the associated clock driver 186 in the subsequent stage). Capacitor 170 (labelled "$C_s$" in the figure) represents the stray capacitance on the charged node associated with the first stage of the circuit. The input to the first stage of the pump circuit of FIG. 8 is input supply 152, which is the power supply (the power supply provided on line 154) in the case where the first stage of FIG. 8 being the first stage of the entire pump circuit, or the output of a previous stage in other cases.

Capacitance $C_c$ (element 168 of FIG. 8 and the associated element of FIG. 7D) can be described as a parasitic capacitance which is the sum of: 1) the parasitic capacitance of capacitor 166 on the clock driver side of the circuit; 2) capacitance due to the routing of the signal at node SlP; and 3) the junction and miller capacitance of transistors 172, 174, and 180. Capacitance $C_s$ (element 170 of FIG. 8 and the associated element of FIG. 7D) can be described as the sum of: 1) the parasitic capacitance of capacitor 166 on the charged node side of the circuit; 2) capacitance due to the routing of the signal at node St1; 3) the junction and miller capacitance of transistor 164 and the transistors of stage 2 of the pump; and 4) the gate capacitance of transistor 160.

Transistor 172 (labelled "A" in the figure) is used to selectively connect node S1P to ground when clock signal Ph 2a 202 is active. Transistor 174 (labelled "B" in the figure) is used to selectively connect node S1P to power supply level 154 when clock signal Ph 1# 204 is active. As noted, transistors 172 and 174 function as drivers for the clock signals used to charge the pump stage capacitors of the charge pump. Transistor 180 (labelled "C" in the figure) is used to transfer a portion of the charge stored in capacitor 168 which is produced during the pumping of the previous stage (here stage 1) to a later stage (here stage 2). Note that transistor 180 corresponds to the implementation of charge transfer switch 144 shown in FIG. 7B. Clock signal Ph 3 206 is used to control the operation of transistor 180. Note that the operation of transistor 180 and clock signal 206 in functioning as charge transfer switch 144 is best understood in conjunction with their relationship to the other components and clock signals which are part of the pump circuit. As will be discussed, the transferring of a portion of this charge serves to reduce the supply current, thereby increasing the efficiency of the charge pump.

Figure 9A:
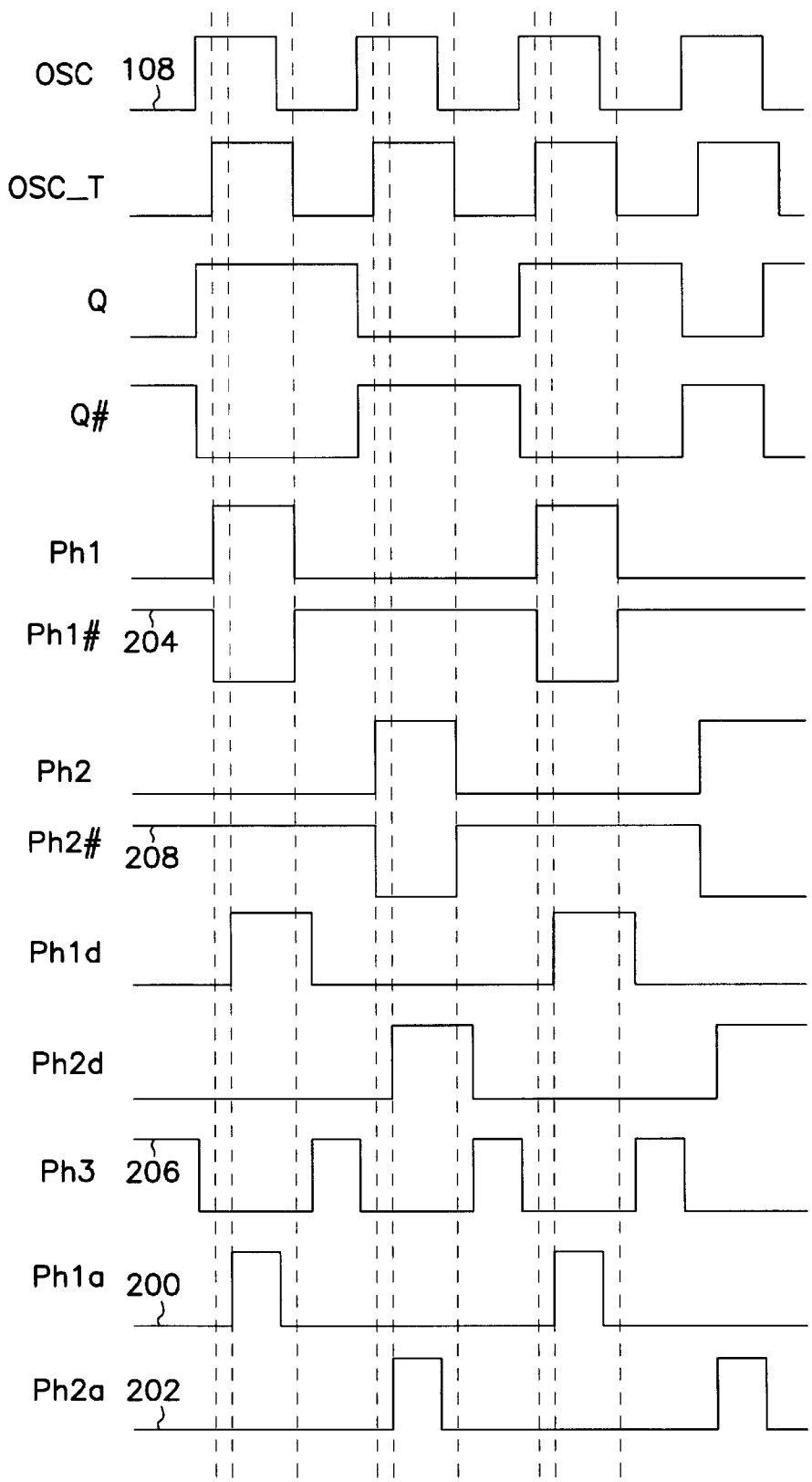
FIG. 9A is a diagram showing the waveforms of the clock signals used to control the operation of the pump circuit for the charge pump of the present invention.

FIG. 9A is a diagram showing the waveforms of the clock signals used to control the operation of pump circuit 150 for the charge pump of the present invention. The generation of each of the clock signals shown is described as follows:

OSC is output signal 108 of oscillator 100 (FIG. 4);
Q is generated from OSC by a "divide by two" circuit, producing a signal having half the frequency of OSC;
Ph 1 is generated by ANDing OSC_T (delayed OSC signal) and Q;
Ph 1# is obtained by inverting Ph 1; Ph 2 is generated by ANDing OSC_T (delayed OSC signal) and Q# (the inversion of Q); Ph 2# is obtained by inverting Ph 2;
Ph 1a is generated by ANDing OSC and Ph 1d (a delayed version of Ph 1);

Ph 2*a* is generated by ANDing OSC and Ph 2*d* (a delayed version of Ph 2); and

PH 3 is generated by NORing Ph 1*d*, Ph 2*d*, and OSC.

The delays noted are such that Ph 1, Ph 2, and Ph 3 are fully non-overlapping, i.e., not active high at the same time. The delays are also chosen such that Ph 1*a* is contained within Ph 1 and Ph 2*a* is contained within Ph 2.

Figure 9B:
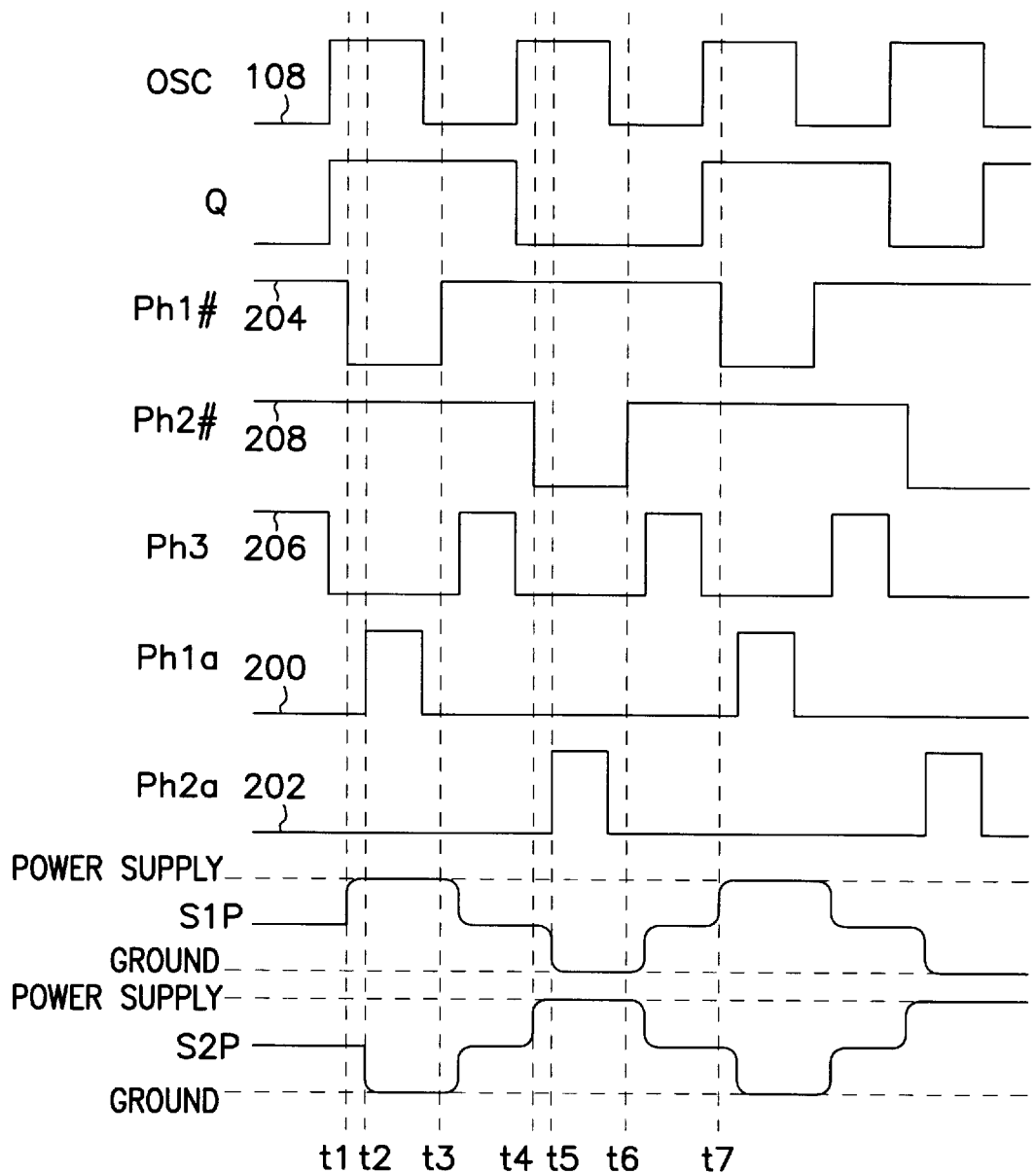
FIG. 9B is a timing diagram for the clock signals used to control the operation of the pump circuit for the charge pump of the present invention.
Figure 10:
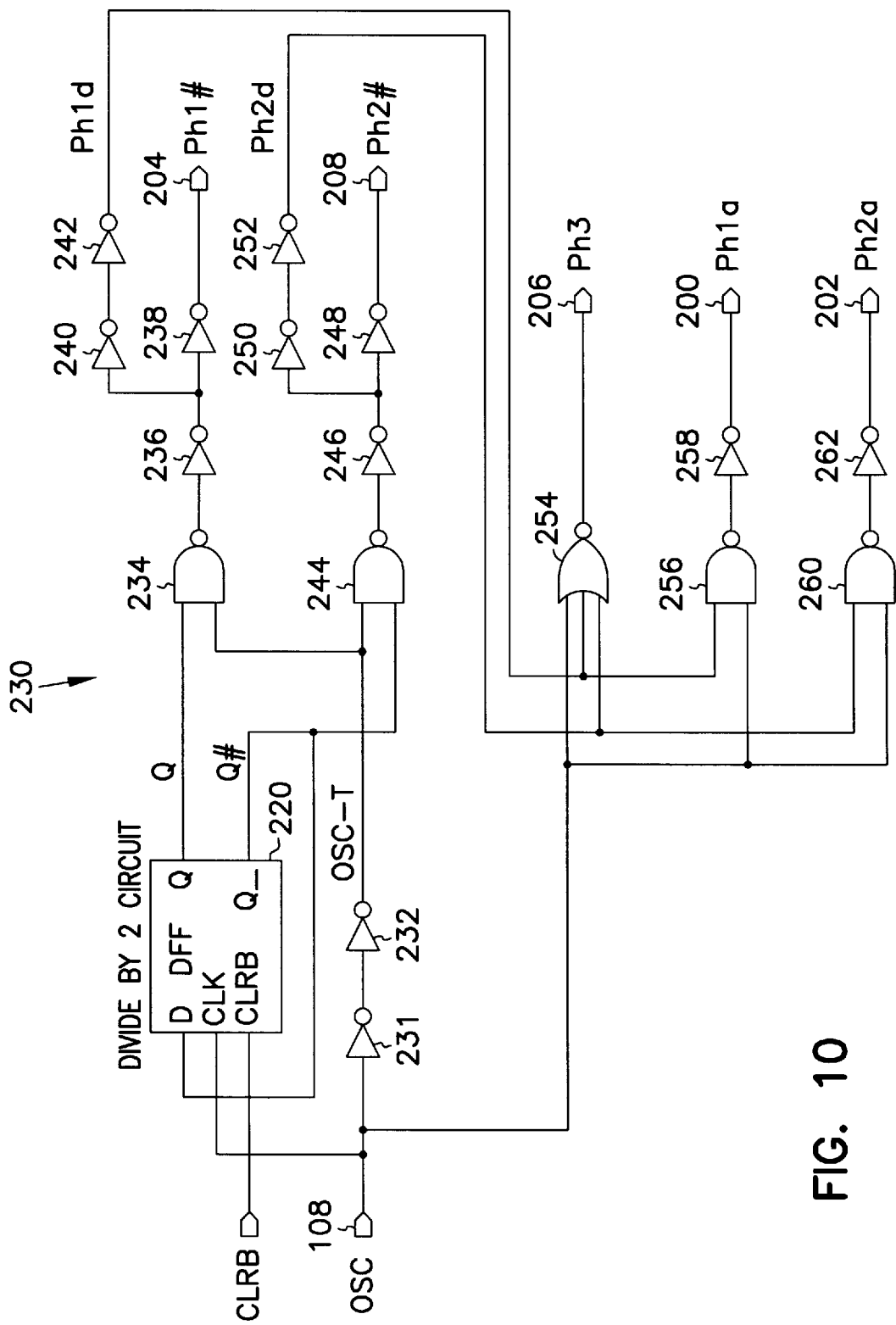
FIG. 10 is a schematic diagram for the clock signal generator which produces the clock signals shown in FIGS. 9A and 9B.

FIG. 10 is a schematic diagram for the clock signal generator 230 which produces the clock signals shown in FIGS. 9A and 9B. As indicated in the figure, the inputs to clock generator 230 are the OSC signal output by oscillator 100 of FIG. 5 and a reset signal used to reset data flip-flop 220 which acts to divide the oscillator signal by two. The outputs of flip-flop 220 are the signals Q and the inverse of Q, noted as Q#.

The logic gates shown in FIG. 10 are used to produce the desired clock signals (Ph 1#, Ph 2#, Ph 3, Ph 1*a*, and Ph 2*a*) which control the operation of the pump circuits of FIG. 7A to FIG. 7D, and FIG. 8. In particular, inverters 231 and 232 provide the delays of OSC signal 108 which produce the OSC-T signal. The combination of NAND gate 234 and inverter 236 is used to produce clock signal Ph 1 by effectively anding signals Q and OSC-T. Signal Ph 1 is then inverted by inverter 238 to produce clock signal Ph 1# 204. Inverters 240 and 242 are used to provide a delayed version of signal Ph 1, noted as Ph 1*d* in the figure.

The combination of NAND gate 244 and inverter 246 is used to produce clock signal Ph 2 by effectively anding signals Q# and OSC-T. Signal Ph 2 is then inverted by inverter 248 to produce clock signal Ph 2# 208. Inverters 250 and 252 are used to provide a delayed version of signal Ph 2, noted as Ph 2*d* in the figure.

Three-input NOR gate 254 has as inputs signals Ph 1*d*, Ph 2*d*, and OSC 108. The output of NOR gate 254 is signal Ph 3 206. NAND gate 256 has as inputs signals OSC 108 and Ph 1*d*. The output of NAND gate 256 is provided as an input to inverter 258, with the output being signal Ph 1*a* 200. NAND gate 260 has as inputs signals OSC 108 and Ph 2*d*. The output of NAND gate 260 is provided as an input to inverter 262, with the output being signal Ph 2*a* 202.

Returning to FIG. 8, the operation of pump circuit 150 will now be described. As noted, capacitor $C_c$ (element 168) is the stray or parasitic capacitance on the clock driver side associated with pump stage capacitor C (element 166), and has the components previously noted. A common implementation of capacitor 166 is in the form of an NMOS transistor having the source and drain terminals connected to the clock signal, and the gate connected to the diode. In such a configuration, the stray capacitance on the clock driver side will be the source to substrate, drain to substrate, and channel to substrate capacitance. It will also include the routing capacitance and the junction and miller capacitances of the devices connected to node S1P. This stray capacitance can be significant, and each time pump stage capacitor 166 is charged and discharged, capacitor 168 must be charged and discharged. This serves to increase the supply current ($I_{supply}$) required to operate the pump circuit and reduces the efficiency of the charge pump, because the power required to charge capacitor 168 is not utilized to operate another aspect of the pump.

In accordance with the present invention, instead of charging and discharging the stray capacitance on the clock driver side associated with the stage capacitor for each pumping stage, transistor 180 and clock signal Ph 3 206 are used to control the transfer of a portion of the charge stored in capacitor 168 from the stage in which the capacitor is charged (here stage 1, labelled "St1") to the next stage (here stage 2, labelled "St2"). Similarly, charge is transferred from the stage 2 capacitor to the stage 1 capacitor (element 168) during another portion of the operating cycle of the charge pump. This reduces the supply current needed to operate the first and second stages, and hence the power consumed by the charge pump. The result is an increase in the efficiency of the charge pump.

FIG. 9B is a timing diagram for the clock signals used to control the operation of pump circuit 150 for the charge pump of the present invention. Referring now to FIGS. 8 and 9B, at time t1 clock signal Ph 1# 204 goes low, turning on transistor 174 and thereby charging node S1P to the level of power supply 154. As discussed, input 152 is power supply level 154 if the first stage of pump circuit 150 of FIG. 8 corresponds to the first stage of the charge pump. If the first stage of pump circuit 150 does not correspond to the first stage of the charge pump, then input 152 is the output from the previous pump stage.

At time t2 clock signal Ph 1*a* 200 goes high, causing node S2P to be connected to ground by means of transistor 182 (labelled "D" in the figure). At time t3 clock signal Ph 1# 204 goes high, causing transistor 174 to disconnect node S1P from power supply 154. At this time, capacitors 166 and 168 are charged to a voltage corresponding to power supply 154.

Soon after, clock signal Ph 3 206 goes high, causing transistor 180 to turn on and effectively "shorting" node S1P to node S2P. Thus, instead of discharging node S1P to ground prior to the next charging cycle, charge is transferred from node S1P to node S2P (i.e. from capacitor 168 to capacitor 184). This has the effect of reducing the required $I_{supply}$ and improving the efficiency of the charge pump. The amount of charge transferred will be up to one-half that stored in capacitor 168.

Shortly prior to time t4, clock signal Ph 3 206 goes low, thereby disconnecting node S1P from node S2P. At time t4, clock signal Ph 2# 208 goes low, turning on transistor 186 (labelled "E" in the figure) and thereby charging node S2P to the level of power supply 154. Note that in less efficient charge pumps, node S2P would be charged up from a ground level. In the present invention, node S2P is charged up from a pre-charged level corresponding to up to one-half the level of power supply 154. This provides a power savings over other charge pump designs.

At time t5 clock signal Ph 2*a* 202 goes high, causing transistor 172 to turn on, thereby discharging node S1P by connecting it to ground. At time t6 clock signal Ph 2# 208 goes high, turning off transistor 186 and thereby disconnecting node S2P from power supply 154. Shortly after time t6, clock signal Ph 3 206 goes high, turning on transistor 180 and thereby connecting node S1P to node S2P. This has the effect of transferring charge from node S2P to node S1P (i.e. from capacitor 184 to capacitor 168).

Shortly before time t7 clock signal Ph 3 206 goes low, turning off transistor 180 and disconnecting node S1P from node S2P. At time t7 clock signal Ph 1# 204 goes low, turning on transistor 174 and thereby connecting node S1P to power supply level 154. This completes one cycle of the operation of pump circuit 150. Note that in less efficient charge pumps, node S1P would be charged up from a ground level. In the present invention, node S1P is charged up from a pre-charged level corresponding to up to one-half the level of power supply 154. This provides a power savings over other charge pump designs.

Another feature of the charge pump of the present invention which is responsible for improving the efficiency of the device is that the drivers for the clock signals used to "pump" the pump stage capacitors are operated by non-overlapping, i.e., not active at the same time, clock signals. This prevents the generation of "crow-bar" current from the power supply to ground when the inputs to the clock drivers are switched. In a typical charge pump design, inverters are used for the clock drivers. These consume current during the switching process. The present invention's use of drivers with clocks which are not active at the same time further reduces the required supply current, improving the efficiency of the charge pump. This feature will be explained in greater detail with reference to FIGS. 8 and 9B.

As seen from FIG. 8, the gate of transistor 172 is tied to clock signal Ph 2a 202, while the gate of transistor 174 is tied to clock signal Ph 1# 204. As seen from FIG. 9B, clock signals 202 and 204 are fully non-overlapping, i.e., the clock signals are not active at the same time. As a result, when the clock signals are applied to pump capacitor 166, a current path from the power supply to ground through transistors 172 and 174 is not established. This is because transistors 172 and 174 are not "on" at the same time.

As noted, many existing charge pump designs use inverters as clock drivers. When the invertor transitions from high to low or low to high, both the p-channel and n-channel transistors in the invertor are "on" for a brief time. This creates a current path from the power supply to ground through those transistors. This current can be significant because large driver stages are used for the clocks. The use of transistors 172 and 174, along with non-overlapping (not active at the same time) clock signals is a feature of the present invention which reduces the supply current, and hence increases the efficiency of the charge pump.

The pump circuit of FIG. 8 uses the threshold voltage cancellation technique to compensate for the voltage drop across the transistor of each stage which is configured as a diode. However, in addition, the present invention utilizes the described clocking scheme in conjunction with a charge transfer switch (in this case transistor 180) to reduce the supply current required to operate the charge pump. This is accomplished by reducing the amount of charge which must be charged into or discharged from the stray capacitance on the clock driver side associated with each stage capacitor by transferring some of this charge from one pump stage to the next. The result is to reduce the power consumed by the charge pump circuit, thereby increasing the efficiency.

Figure 11:
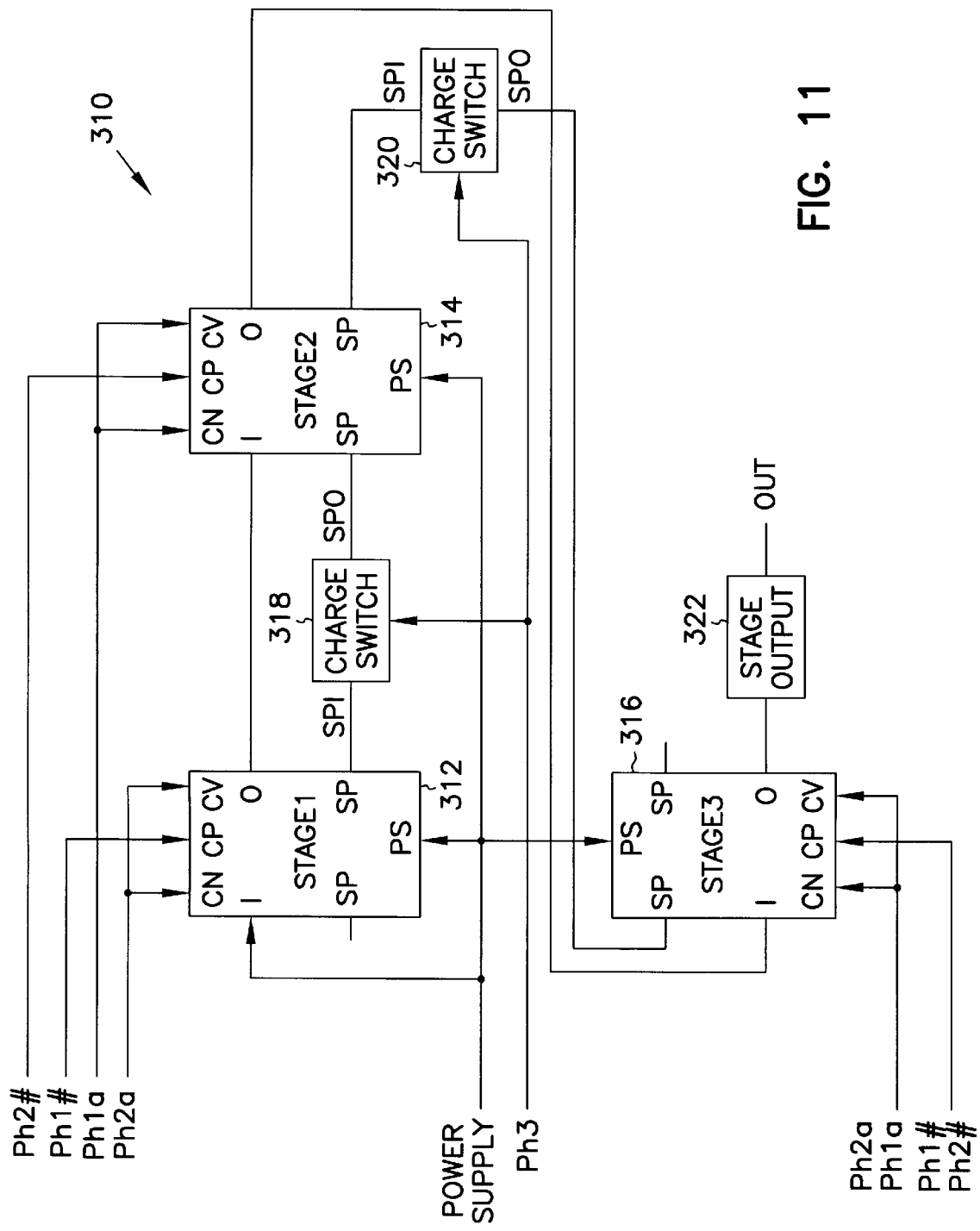
FIG. 11 is a block diagram for a three stage pump circuit and the charge transfer switch for use in a charge pump of the present invention.

FIG. 11 is a block diagram for a three stage pump circuit and charge transfer switch 310 for use in a charge pump of the present invention. As shown in the figure, three stage pump circuit 310 includes three pump stages (elements 312, 314, and 316) with charge transfer switch 318 connecting stages 1 and 2 and charge transfer switch 320 connecting stages 2 and 3. The output of pump stage 3 316 provides the input to output stage 322, which provides the output voltage (labelled "OUT" in the figure) of pump circuit 310. The operation of the pump stages and the clock signals is understood by reference to the previous figures. In FIG. 11, the charge sharing will not be as efficient as in a two or four stage pump, but will still provide an increased power saving over other charge pump designs.

Figure 12:
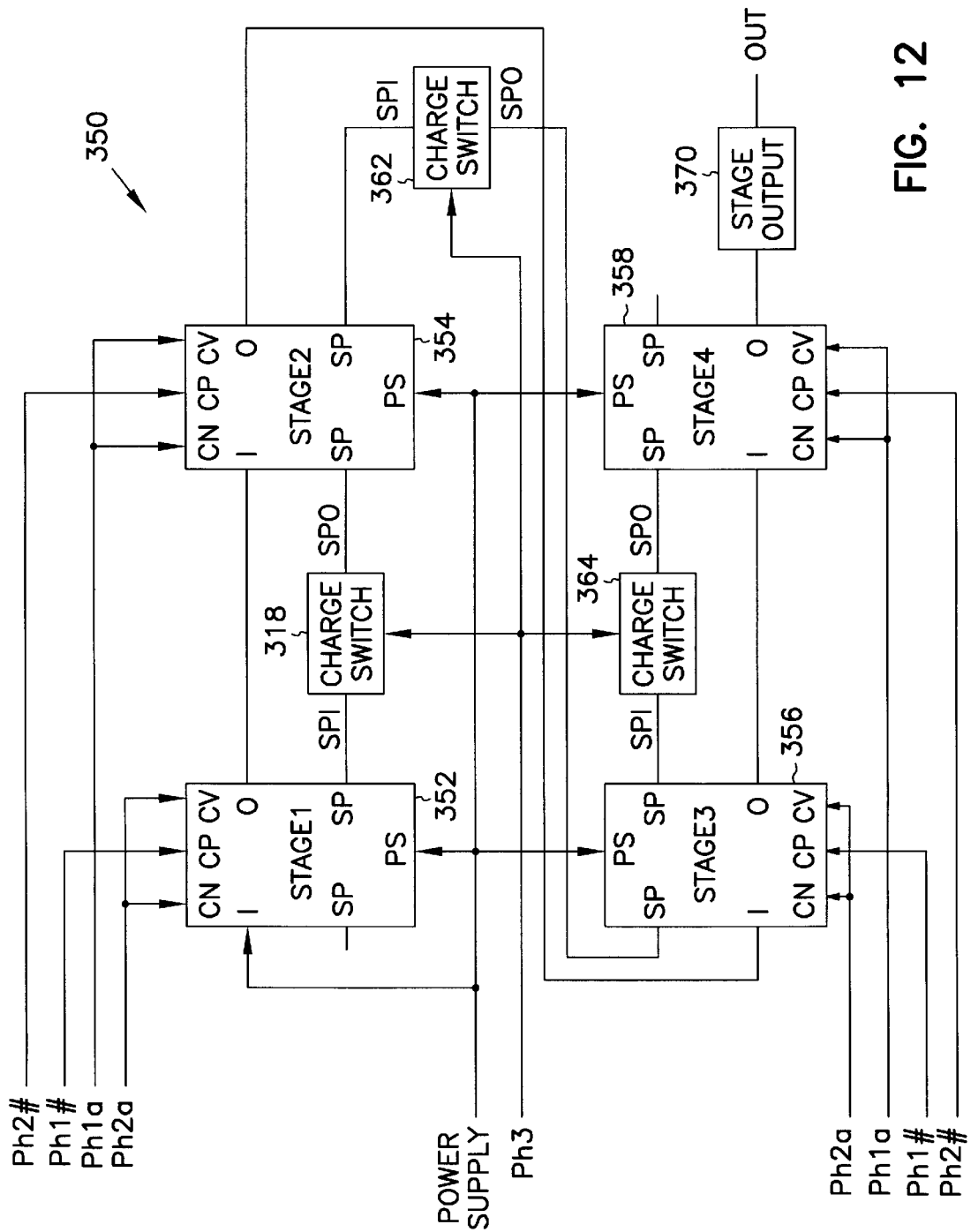
FIG. 12 is a block diagram for a four stage pump circuit and the charge transfer switch for use in a charge pump of the present invention.

FIG. 12 is a block diagram for a four stage pump circuit and charge transfer switch 350 for use in a charge pump of the present invention. As shown in the figure, four stage pump circuit 350 includes four pump stages (elements 352, 354, 356, and 358) with charge transfer switch 360 connecting stages 1 and 2, charge transfer switch 362 connecting stages 2 and 3, and charge transfer switch 364 connecting stages 3 and 4. The output of pump stage 4 358 provides the input to output stage 370, which provides the output voltage (labelled "OUT" in the figure) of pump circuit 350. Note that charge transfer switch 362 is optional, although it may be retained for ease in physical implementation of the circuit, or in the case where the stage capacitors (element 166 in FIG. 8) have different values. The operation of the pump stages and the clock signals is understood by reference to the previous figures.

Although the present invention has been described in the context of a more efficient charge pump, the apparatus and technique described have wider application. The clocking scheme and charge transfer switch described herein may be used for reducing the power consumption of other circuits having internal signals or nodes which are in opposite phase to each other. The invention is used to reduce the power consumed in charging and discharging the stray capacitance associated with the signals or nodes.

Figure 13:
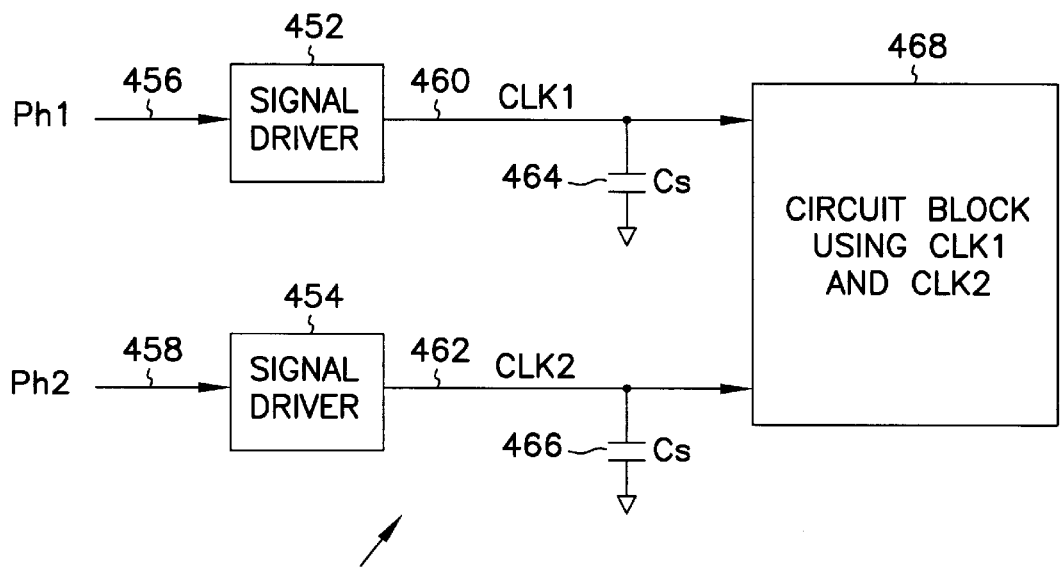
FIG. 13 is a block diagram showing the elements of a general circuit to which the clocking scheme and charge transfer switch of the present invention may be applied.

FIG. 13 is a block diagram showing the elements of a general system or circuit 450 to which the clocking scheme and charge transfer switch of the present invention may be applied. As shown in the figure, circuit 450 includes signal drivers 452 and 454 having signals 456 (labelled "ph 1") and 458 (labelled "ph 2"), respectively, as inputs. Signal drivers 452 and 454 typically take the form of inverters or the n-channel and p-channel transistors shown in FIGS. 7D and 8. The outputs of signal drivers 452 and 454 are clock signals 460 (labelled "clk 1") and 462 (labelled "clk 2"). Clock signals 460 and 462 have an associated stray capacitance 464 and 466 (labelled "$C_s$"), and are used as inputs to a circuit 468. Circuit 468 may for example, be a digital transmission line or the previously described charge pump. Circuit 468 can also represent the stray capacitance of the signal drivers themselves or that of a device being driven. The present invention provides a greater benefit in the situation where the capacitor load on the nodes of the clock signals is significant.

Figure 14:
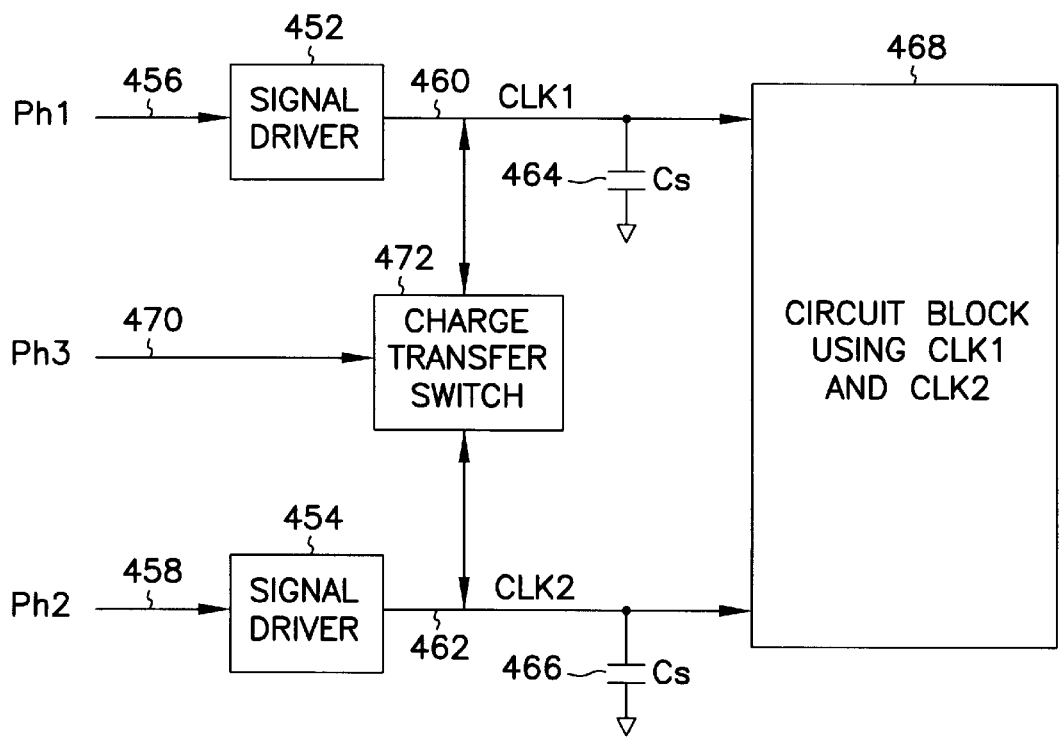
FIG. 14 is a block diagram showing the circuit of FIG. 13 to which the clocking scheme and charge transfer switch of the present invention have been added.

FIG. 14 is a block diagram showing the circuit of FIG. 13 to which the clocking scheme and charge transfer switch 472 of the present invention have been added. As shown in the figure, charge transfer switch 472 and its associated clock signal 470 (labelled "ph 3") have been added to the circuit of FIG. 13. Charge transfer switch 472 is used to transfer a portion of the charge stored in stray capacitance 464 to stray capacitance 466, or vice-versa.

In general, in order to apply the clocking scheme and charge transfer switch disclosed herein, the circuit to which they are applied should have the following characteristics:
1. The circuit should include 2 signal drivers;
2. The signals output by the signal drivers (or the internal signals or nodes in the most general case in which no signal drivers are present) should be in opposite phase to each other (one signal is high, the other low during active use of the signals);
3. It should be possible to modify the regular timing of the signals so as to add a switching signal pulse during the transition of the signals;
4. It should be the case that the precise shape of the rising or falling edge of the signals is not critical to the use of the signals; and
5. It should be possible to add a clock signal generator to the existing circuitry in order to generate the switching signal pulse.

Figure 15A:
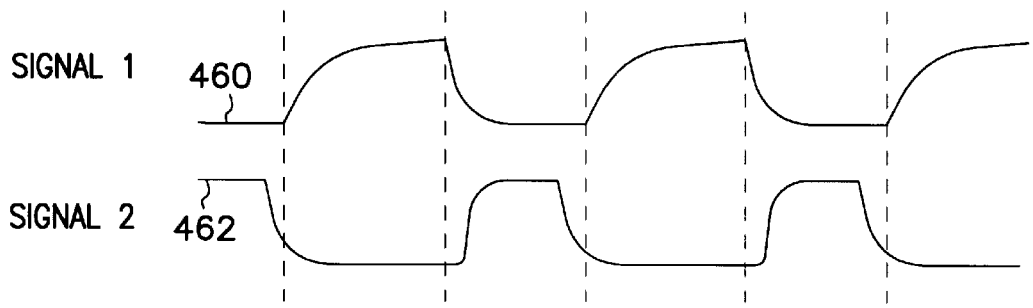
FIGS. 15(A) and 15(B) show the relative timing of the two outputs of the signal drivers of FIG. 14, and the switching signal pulse used to activate the charge transfer switch.
Figure 15B:
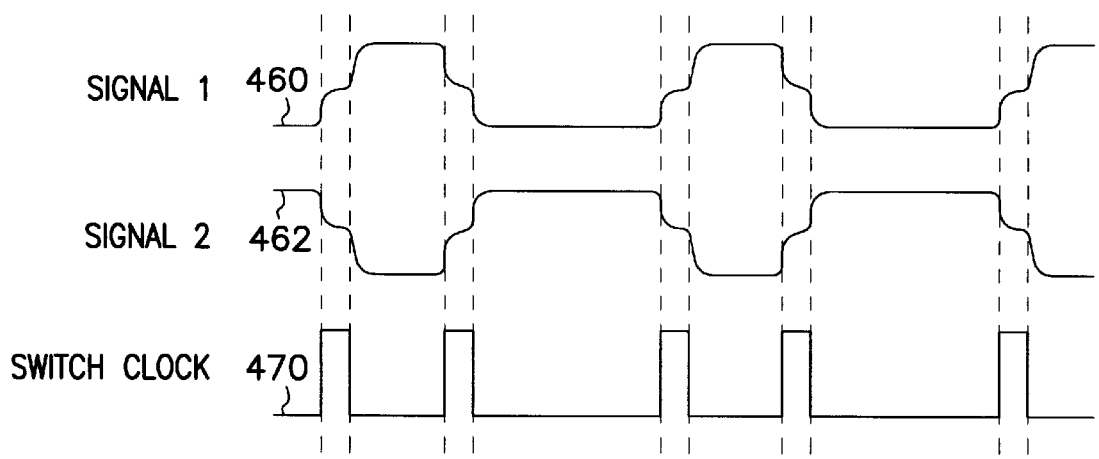

FIGS. 15(A) and 15(B) show the relative timing of the two signals output by the signal drivers of FIG. 14, and switching signal pulse 470 used to activate charge transfer switch 472. FIG. 15(A) shows signals 460 and 462 which are the outputs of the signal drivers shown in FIG. 14. As noted, signals 460 and 462 are in opposite phase to each other.

FIG. 15(B) shows how switching pulse 470 is used during the transitions of signals 460 and 462 to operate charge transfer switch 472. In accordance with the clocking scheme previously described, when switching signal 470 is active, charge transfer switch 472 acts to transfer a portion of the charge stored in stray capacitance 464 or 466 between the two capacitances. This reduces the power consumed in operating the circuit for which the clock signals (in this example) serve as inputs.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. A charge pump for transforming an input voltage to an output voltage, comprising:

a first and a second pump stage, wherein each pump stage includes a stage capacitor which is charged and discharged during a clock cycle of the charge pump, clock drivers coupled to the stage capacitor on a clock driver side of said stage capacitor and configured to control charging and discharging of the stage capacitor in response to clock signals, and wherein the stage capacitor has an associated stray capacitance on the clock driver side; and a charge transfer switch connected to the clock driver side of the first pump stage which electrically connects the stray capacitance of the first pump stage on the clock driver side to the stray capacitance on the clock driver side of the second pump stage in response to a control signal, thereby transferring charge between the stray capacitance of the first pump stage and the stray capacitance of the second pump stage.

2. The charge pump of claim 1, further comprising:

a control signal generator which generates the control signal.

3. The charge pump of claim 1, wherein each of the first and second pump stages further comprises:

a diode connected between the stage capacitor and an input voltage for the pump stage, wherein the diode prevents discharging of the stage capacitor.

4. The charge pump of claim 3, wherein the diode is a properly configured transistor.

5. The charge pump of claim 4, wherein the diode has an associated voltage drop across it equal to the threshold voltage of the transistor, and each of the first and second pump stages further comprises:

a threshold voltage canceler which compensates for the voltage drop across the diode.

6. The charge pump of claim 1, wherein the charge transfer switch is a transistor which is electrically connected between the stray capacitance on the clock driver side of the stage capacitor of the first pump stage and the stray capacitance on the clock driver side of the stage capacitor of the second pump stage.

7. A charge pump for transforming an input voltage to an output voltage, comprising:

a pump circuit having an input and an output;

a clock signal generator which generates a plurality of clock signals used to control operation of the pump circuit, wherein the input of the pump circuit receives an input supply voltage and the clock signals generated by the clock signal generator, and the output of the pump circuit asserts a transformed input supply voltage, and wherein the pump circuit comprises a first and a second pump stage, wherein each pump stage includes a stage capacitor which is charged and discharged during a clock cycle of the charge pump, first and second clock drivers coupled to the stage capacitor on a clock driver side of the stage capacitor and configured to control charging and discharging of the stage capacitor in response to first and second clock signals, and wherein the stage capacitor has an associated stray capacitance on the clock driver side; and a charge transfer switch connected to the clock driver side of the first pump stage which electrically connects the stray capacitance of the first pump stage and the stray capacitance of the second pump stage upon receipt of one of the clock signals generated by the clock signal generator, thereby transferring charge between the stray capacitance of the first pump stage and the stray capacitance of the second pump stage.

8. The charge pump of claim 7, further comprising:

a regulator having an input and an output, wherein the input of the regulator is couple to the output of the pump circuit and the output of the regulator asserts a control signal which acts to vary the output of the clock signal generator.

9. The charge pump of claim 7, wherein each of the first and second pump stages which are part of the pump circuit further comprises:

a diode connected between the stage capacitor and an input voltage for the pump stage, wherein the diode prevents discharging of the stage capacitor.

10. The charge pump of claim 9, wherein the diode is a properly configured transistor.

11. The charge pump of claim 10, wherein the diode has an associated voltage drop across it equal to the threshold voltage of the transistor, and each of the first and second pump stages further comprises:

a threshold voltage canceler which compensates for the voltage drop across the diode.

12. The charge pump of claim 7, wherein the charge transfer switch is a transistor which electrically connects the stray capacitance of the first pump stage and the stray capacitance of the second pump stage.

13. A charge pump for transforming an input voltage to an output voltage, comprising:

a first and a second pump stage, wherein each pump stage includes a stage capacitor which is charged and discharged during a clock cycle of the charge pump, first and second clock drivers coupled to the stage capacitor on a clock driver side of the stage capacitor and configured to control charging and discharging of the stage capacitor in response to first and second clock signals, and wherein the stage capacitor has an associated stray capacitance on the clock driver side; and a charge transfer switch connected to the clock driver side of the first pump stage which electrically connects the stray capacitance of the first pump stage to the stray capacitance of the second pump stage upon receipt of a control signal, thereby transferring charge between the stray capacitance of the first pump stage and the stray capacitance of the second pump stage.

14. The charge pump of claim 13, further comprising:

a control signal generator which generates the control signal.

15. The charge pump of claim 13, wherein each of the first and second pump stages further comprises:

a diode for preventing discharging of the stage capacitor.

16. The charge pump of claim 15, wherein the diode is a properly configured transistor.

17. The charge pump of claim 16, wherein the diode has an associated voltage drop across it equal to the threshold voltage of the transistor, and each of the first and second pump stages further comprises:

a threshold voltage canceler which compensates for the voltage drop across the diode.

18. The charge pump of claim 13, wherein the charge transfer switch is a transistor which electrically connects the stray capacitance of the first pump stage and the stray capacitance of the second pump stage.

19. A method of operating a charge pump to transform an input voltage to an output voltage, the charge pump comprising pump stages, each of the pump stages including a stage capacitor which is charged and discharged during a clock cycle, clock drivers coupled to the stage capacitor on a clock driver side of the stage capacitor and configured to control charging and discharging of the stage capacitor in response to clock signals wherein the stage capacitor has an associated stray capacitance on the clock driver side, said method comprising the steps of:

charging the pump stage capacitor and the stray capacitance on the clock driver side of a first one of the pump stages to a predetermined voltage level;

electrically connecting the stray capacitance on the clock driver side of the first one of the pump stages to the stray capacitance on the clock driver side of a second one of the pump stages, thereby transferring charge between the stray capacitance of the first one of the pump stages and the stray capacitance of the second one of the pump stages; and charging the pump stage capacitor of the second one of the pump stages to a predetermined voltage level.

20. The method of claim 19, wherein the step of electrically connecting the stray capacitance of the first pump stage to a stray capacitance of a second pump stage further comprises:

generating a control signal for operating a charge transfer switch which electrically connects the stray capacitance of the first pump stage to the stray capacitance of the second pump stage.

21. A charge pump for transforming an input voltage to an output voltage, comprising:

a first pump stage, wherein the first pump stage includes a first stage capacitor which is charged and discharged during a clock cycle of the charge pump, first and second first stage clock drives coupled to the first stage capacitor on a clock driver side of the first stage capacitor and configured to control charging and discharging of the first stage capacitor in response to first and second first stage clock signals, and wherein the the first stage capacitor has an associated first stage capacitance on the clock driver side of the first pump stage;

a second pump stage, wherein the second pump stage includes a second stage capacitor which is charged and discharged during a clock cycle of the charge pump, first and second stage clock drives the second stage capacitor on a clock driver side of the second stage capacitor and configured to control charging and discharging of the second stage capacitor in response to first and second second stage clock signals, and wherein the second stage capacitor has an associated second stage stray capacitance on the clock driver side of the second pump stage;

a charge transfer switch connected to the clock driver side of the first pump stage which electrically connects the first stage stray capacitance on the clock driver side of the first pump stage to the second stage stray capacitance on the clock driver side of the second pump stage in response to a control signal, thereby transferring charge between the first stage capacitance and the second stage stray capacitance; and a control signal generator which generates the control signal.

22. The charge pump of claim 21, wherein each of the first and second pump stages further comprises:

a diode connected between the stage capacitor and an input voltage for the pump stage, wherein the diode prevents discharging of the stage capacitor.

23. The charge pump of claim 22, wherein the diode is a properly configured transistor.

24. The charge pump of claim 23, wherein the diode has an associated voltage drop across it equal to the threshold voltage of the transistor, and each of the first and second pump stages further comprises:

a threshold voltage canceler which compensates for the voltage drop across the diode.

25. The charge pump of claim 21, wherein the charge transfer switch is a transistor which is electrically connected between the first stage stray capacitance on the first stage clock drivers side and the second stage stray capacitance on the second stage clock drivers side.

26. The charge pump of claim 21, wherein the first and second first stage clock signals are not at the same time.

27. The charge pump of claim 21, wherein the first and second second stage clock signals are not active at the same time.

28. A charge pump for transforming an input voltage to an output voltage, comprising:

a first pump stage, wherein the first pump stage includes a first stage capacitor which is charged and discharged during a clock cycle of the charge pump and first and second first stage clock drivers which drive first and second first stage clock signals used to operate the first stage capacitor, and wherein the first stage capacitor has an associated first stage stray capacitance on the first stage clock drivers side;

a second pump stage, wherein the second pump stage includes a second stage capacitor which is charged and discharged during a clock cycle of the charge pump and first and second second stage clock drivers which drive first and second second stage clock signals used to operate the second stage capacitor, and wherein the second stage capacitor has an associated second stage stray capacitance on the second stage clock drivers side;

a charge transfer switch which electrically connects the first stage stray capacitance on the first stage clock drivers side to the second stage stray capacitance on the second stage clock drivers side upon receipt of a control signal, thereby transferring charge between the first stage stray capacitance and the second stage stray capacitance; and a control signal generator which generates the control signal, wherein the first first stage clock driver is an n-channel device and the second first stage clock driver is a p-channel device.

29. A charge pump for transforming an input voltage to an output voltage, comprising:

a first pump stage, wherein the first pump stage includes a first stage capacitor which is charged and discharged during a clock cycle of the charge pump and first and second first stage clock drivers which drive first and second first stage clock signals used to operate the first stage capacitor, and wherein the first stage capacitor has an associated first stage stray capacitance on the first stage clock drivers side;

a second pump stage, wherein the second pump stage includes a second stage capacitor which is charged and discharged during a clock cycle of the charge pump and first and second second stage clock drivers which drive first and second second stage clock signals used to operate the second stage capacitor, and wherein the second stage capacitor has an associated second stage stray capacitance on the second stage clock drivers side;

a charge transfer switch which electrically connects the first stage stray capacitance on the first stage clock drivers side to the second stage stray capacitance on the second stage clock drivers side upon receipt of a control signal, thereby transferring charge between the first stage stray capacitance and the second stage stray capacitance; and a control signal generator which generates the control signal, wherein the first second stage clock driver is an n-channel device and the second second stage clock driver is a p-channel device.

30. The charge pump of claim 21, wherein the control signal is not active when any of the first or second first stage clock signals and first or second second stage clock signals are active.

31. A low power consumption system, comprising:

a first signal driver having a first capacitor, a first output, and first driver on a clock driver side of the first capacitor, said first driver configured to control charging and discharging of the first capacitor in response to a first set of clock signals, wherein the first signal driver is configured to assert a first signal at the first output, and wherein there is a first stray capacitance on the clock driver side of the first capacitor;

a second signal driver having a second capacitor, a second output, and a second driver on a clock driver side of the second capacitor, said second driver configured to control charging and discharging of the second capacitor in response to a second set of clock signals, wherein the second signal driver is configured to assert a second signal at the second output, wherein the first signal and the second signal are in opposite phase to each other, and wherein there is a second stray capacitance on the clock driver side of the second capacitor; and a charge transfer switch connected to the clock driver side of the first signal driver, which electrically connects the first stray capacitance to the second stray capacitance upon receipt of a control signal, thereby transferring charge between the first and second stray capacitances.

32. The system of claim 31 further comprising:

a control signal generator which generates the control signal.

* * * * *

UNITED STATES PATENT AND TRADEMARK OFFICE
CERTIFICATE OF CORRECTION

PATENT NO.   : 5,818,289
DATED        : October 6, 1998
INVENTOR(S)  : Christophe J. Chevallier et al.

It is certified that error appears in the above-identified patent and that said Letters Patent is hereby corrected as shown below:

At Col. 16, line 9, claim 21, please delete "first stage capacitance" and insert --first stage stray capacitance--.

At Col. 16, line 32, claim 26, please delete "not at the" and insert --not active at the--.

At Col. 18, line 27, claim 32, please delete "claim 31 further" and insert --claim 31 further--.

UNITED STATES PATENT AND TRADEMARK OFFICE
CERTIFICATE OF CORRECTION

PATENT NO. : 5,818,289
DATED : October 6, 1998
INVENTOR(S) : Christophe J. Chevallier et al.

It is certified that error appears in the above-identified patent and that said Letters Patent is hereby corrected as shown below:

At Col. 8, line 63, please insert a paragraph after the semicolon.

At Col. 8, line 65, please insert a paragraph after the semicolon.

At Col. 14, line 3, claim 8, please delete "couple" and insert --coupled--.

At Col. 15, line 23, claim 19, please delete "signals wherein" and insert --signals, wherein--.

At Col. 15, line 52, claim 21, please delete "drives" and insert --drivers--; at lines 56-57, please delete "wherein the the first" and insert --wherein the first--; at line 62, please delete "and second stage clock drives the second stage" and insert --and second second stage clock drivers coupled to the second stage--.

Signed and Sealed this

Thirteenth Day of April, 1999

Attest:

Q. TODD DICKINSON

*Attesting Officer*   *Acting Commissioner of Patents and Trademarks*